United States Patent [19]

Uemae et al.

[11] Patent Number: 5,405,879
[45] Date of Patent: Apr. 11, 1995

[54] AQUEOUS DISPERSION OF ACRYLIC POLYMER

[75] Inventors: Masami Uemae, Hiratsuka; Takeshi Komatsu, Ninomiya, both of Japan

[73] Assignee: Nippon Carbide Kogyo Kabushiki Kaisha, Tokyo, Japan

[21] Appl. No.: 863,080

[22] Filed: Apr. 3, 1992

[30] Foreign Application Priority Data

Apr. 5, 1991 [JP] Japan .................. 3-099738

[51] Int. Cl.$^6$ .......................................... C08F 265/00
[52] U.S. Cl. .................... 523/201; 524/458; 524/460; 524/521; 524/522
[58] Field of Search ............. 524/460, 522, 458, 521; 523/201

[56] References Cited

U.S. PATENT DOCUMENTS

| | | | |
|---|---|---|---|
| 4,305,859 | 12/1981 | Mc Ewan et al. | 524/804 |
| 4,385,152 | 5/1983 | Boyack et al. | 524/460 |
| 4,760,110 | 7/1988 | Das | 524/460 |
| 4,826,907 | 5/1989 | Murao et al. | 524/394 |
| 4,931,494 | 6/1990 | Auchter | 524/460 |
| 4,981,885 | 1/1991 | Engel et al. | 524/460 X |
| 5,002,982 | 3/1991 | Neubert | 524/460 X |

FOREIGN PATENT DOCUMENTS 0212358  3/1987  European Pat. Off. .

OTHER PUBLICATIONS

World Patents Index Latest AN 83-836810 (JP-A-58 187 468).
World Patents Index Latest AN 83-836811 (JP-A-58 187 469).
World Patent Index Latest AN 90-073063 (JP-A-2 028 269).

*Primary Examiner*—Judy M. Reddick
*Attorney, Agent, or Firm*—Sherman and Shalloway

[57] ABSTRACT

An aqueous dispersion of an acrylic polymer comprising acrylic polymer particles dispersed in an aqueous medium in which aqueous dispersion the acrylic polymer particles are composite particles composed of the core part and skin layer part of acrylic polymers having mutually different glass transition temperatures. The aqueous dispersion is useful for preparation of an aqueous coating composition excellent in normal-temperature and low-temperature resistance to chipping.

12 Claims, No Drawings

AQUEOUS DISPERSION OF ACRYLIC POLYMER

DETAILED DESCRIPTION OF THE INVENTION

This invention relates to an aqueous dispersion of an acrylic polymer comprising particles of the acrylic polymer dispersed in an aqueous medium, and, detailedly, relates to an aqueous dispersion composed of composite particles of acrylic polymers having as the core part a comparatively predominant amount of an acrylic polymer having a certain glass transition temperature and as the skin layer part of comparatively inferior amount of an acrylic polymer having a glass transition temperature lower than that. More detailedly, this invention relates to an aqueous dispersion of an acrylic polymer useful for preparation of a coating composition such as a mastic coating, a sound insulating coating, a vibration-proof coating or a caulking material, particularly a chipping-resistant aqueous coating composition which is used, for example, for protecting the outdoor sheet metal working members of wheeled vehicles, especially automobiles such as the back side of the flooring, tire houses, gasoline tank, etc. from marring caused by flipped stones, etc., so-called "chipping", and which is excellent in various performances such as resistance to chipping, adhesion to the sheet metal such as parts, uniformity and smoothness of the coat, resistance to water, resistance to gasoline, resistance to impact and sound insulating properties and is further excellent in low-temperature characteristics such as resistance to chipping at an extremely low temperature of −30° C. or less; and an aqueous coating composition and particularly a chipping-resistant aqueous coating composition comprising the above aqueous dispersion and an inorganic filler.

Heretofore, as aqueous coating materials for resistance to chipping to be used for the outdoor sheet metal working members of wheeled vehicles such as, for example, automobiles, there have been known those wherein an inorganic filler such as calcium carbonate or talc had been compounded into a rubber latex or an acrylic copolymer emulsion as a vehicle (see for example, Japanese Laid-Open Patent Publication Nos. 180617/1982 and 187468/1983, etc.)

However, in these known coating materials for resistance to chipping, it is not generally easy to satisfy at the same time in good balance both of characteristics such as resistance to chipping, adhesion to base materials and resistance to impact at ordinary temperature and low-temperature characteristics such as resistance to chipping at an extremely low temperature, for example of −30° C. or less. For example, there are problems that when a polymer having a high glass transition temperature (hereinafter sometimes abbreviated as Tg) is used as a vehicle in order to enhance resistance to chipping at ordinary temperature, the coat becomes brittle at extremely low temperatures and thus resistance to chipping at low temperatures lowers, and on the other hand, when the Tg of the vehicle polymer is lowered in order to enhance resistance to chipping at low temperatures, the formed coat is soft and in this turn resistance to chipping at ordinary temperature lowers.

Several proposal have hitherto been made in order to obviate such drawbacks, and for example, in Japanese Laid-Open Patent Publication No. 28269/1990, it is proposed to use, as the substrate resin (vehicle component) in a coating composition for resistance to chipping, a copolymer which is formed by emulsion polymerization of styrene, butadiene and an acrylic monomer, and whose glass transition temperature is 0° C. or less and butadiene content is 5 to 50 weight parts per 100 weight parts of the copolymer.

However, although, according to the example of the above laid-open patent publication, the above substrate resin is prepared by emulsion polymerizing an acrylic monomer in the presence of a styrene-butadiene rubber latex, when the present inventors tried the preparation of the copolymer according to the method disclosed in the example, during emulsion polymerization of the acrylic monomer in the presence of the styrene-butadiene rubber latex, the acrylic monomer graft polymerizes with the rubber latex through the remaining double bonds derived from the butadiene unit, and thus a copolymer having the desired rubber elasticity was not obtained and instead was only obtained a hard and brittle copolymer.

Further, U.S. Pat. No. 4,826,907 discloses as a chipping-resistant coating composition a (meth)acrylic resin emulsion comprising a specific blend of two kinds of (meth)acrylic resin emulsions having different Tg values each obtained by using specific surfactants and a specific salt of a water soluble polyvalent metal.

However, although the chipping-resistant coating composition disclosed in the examples of the specification of the above U.S. patent were excellent in that a thick coat can be formed without blister in the drying step and resistance to chipping is also good, it has another problem that resistance to water (adhesion to base materials) is not necessarily sufficient.

On the other hand, as far a water dispersion comprising composite particles of a acrylic polymer there is disclosed, for example, in Japanese Laid-Open Patent Publication No. 78234/1978 a coating material composition wherein a specific amount of an inorganic pigment was compounded into an emulsion obtained by subjecting an inferior amount of a monomer capable of forming a polymer having a Tg value of 5° C. or more to mono- or multi-stage emulsion polymerization in an emulsion containing a predominant amount of an acrylic polymer having a Tg value of −20° C. or less.

However, when the emulsion of copolymer particles disclosed in the above Japanese Laid-Open Patent Publication and composed of the core part comprising a soft polymer and the shell part comprising a hard polymer lowering adhesion, the resulting coat is short of rubber elasticity and a coat good in resistance to chipping, particularly low-temperature resistance to chipping cannot be obtained.

The present inventors have intensely studied aiming to provide an aqueous resin emulsion suitable as a vehicle in a chipping-resistant aqueous coating composition not only excellent in ordinary-temperature characteristics such as resistance to chipping, adhesion to the base material surface, resistance to impact, resistance to water, resistance to solvents and resistance to weather at ordinary temperature, but excellent in low-temperature characteristics such as resistance to chipping at an extremely low temperature, for example of −30° C. or less.

As a result, they found that the above object could be attained by using as a while an aqueous dispersion of composite particles having plural acrylic polymers having a combination of certain specific Tg values at the core part and at the skin layer part, respectively, and they completed this invention.

Thus, this invention provides an aqueous dispersion of an acrylic polymer comprising particles of the acrylic polymer dispersed in an aqueous medium, wherein the particles of the acrylic polymer are composite particles comprising a core part mainly comprising a carboxyl group-containing acrylic polymer (A) whose glass transition temperature is in the range of −30° C. to 10° C. and a skin layer part covering the core part and mainly comprising an acrylic polymer (B) whose glass transition temperature is −10° C. or less, the polymer (A) and the polymer (B) are contained in amounts of 50 to 95 weight % and 50 to 5 weight % based on the weight of the particles, respectively, and the glass transition temperature (TgA) of the polymer (A) is higher than the glass transition temperature (TgB) of the polymer (B).

The aqueous dispersion of the invention is further detailed described below.

The aqueous dispersion of the invention is essentially composed of an aqueous medium and acrylic polymer fine particles stably dispersed therein, and has its great characteristics in that the acrylic polymer fine particles are composite particles comprising a combination of (a) a core part mainly comprising a carboxyl group-containing acrylic polymer (A) whose glass transition temperature is in the range of −30° C. to 10° C. and (b) a skin layer part mainly comprising an acrylic polymer (B) which covers the core part and whose glass transition temperature is −10° C. or less.

Carboxyl group-containing acrylic polymer (A):

The acrylic polymer (A) constituting the core part of the composite particles of the invention is one containing carboxyl groups, and its content is not strictly limited and can be varied over a wide range in accordance with easiness of emulsion polymerization, characteristics desired for the final aqueous dispersion, etc. In general, it is convenient that the content is in the range of 2.5 to 50 mg equivalent, preferably 5 to 100 mg equivalent and more preferably 10 to 80 mg equivalent per 100 g of the acrylic polymer. Further, it is desirable that the carboxyl group content of the acrylic polymer (A) is 50 weight % or more, preferably 70 weight % or more and more preferably 80 weight % or more of the total carboxyl group content of the composite particles.

Further, it is important that the acrylic polymer (A) has a glass transition temperature (Tg) the range of −30° C. to 10° C. When the Tg value of the acrylic polymer (A) consisting the core part is lower than −30° C., the strength of the resulting coat becomes insufficient and normal temperature resistance to chipping, adhesion to the surface of the base material, resistance to water, etc. tend to be insufficient, and when the Tg value is higher than 10° C., rubber elasticity tends to be lost and normal-temperature and low-temperature resistances to chipping tend to lower. Thus, it is preferred that the acrylic polymer (A) has Tg in the range of generally −20° C. to a temperature under 5° C. and particularly −15° C. to 3° C.

Further, although the molecular weight of the acrylic polymer (A) is not particularly limited, it can have a weight average molecular weight of usually 500,000 or more, preferably 1,000,000 or more.

As far as the acrylic polymer (A) is one having the above characteristics, the kind of monomers constituting the polymer is not strictly limited. However, it is desirable that it is an acrylic copolymer formed usually by copolymerizing the following three monomers (M-1), (M-2) and (M-3) or four monomers (M-1), (M-2), (M-3) and (M-4) so as to satisfy the above carboxyl group content and Tg:

(M-1) An acrylic acid alkyl ester which is represented by the formula $$CH_2=CH-COOR^1 \qquad (I)$$

wherein R represents a straight-chain or branched chain alkyl group having 2 to 12 carbon atoms, preferably 4 to 8, and wherein the Tg of its homopolymer is −20° C. or less, preferably −30° C. or less and more preferably −40° C. or less: For example, ethyl acrylate, butyl acrylate, isobutyl acrylate, pentyl acrylate, isoamyl acrylate, hexyl acrylate, octyl acrylate, isooctyl acrylate, 2-ethylhexyl acrylate, nonyl acrylate, isononyl acrylate, decyl acrylate, etc. Preferred among them are butyl acrylate, octyl acrylate, 2-ethylhexyl acrylate, isononyl acrylate, etc.

(M-2) An $\alpha,\beta$-unsaturated mono- or dicarboxylic acid having 3 to 5 carbon atoms: For example, acrylic acid, methacrylic acid, crotonic acid, citraconic acid, itaconic acid, maleic acid, maleic anhydride, fumaric acid, etc. Particularly preferred among them are acrylic acid, methacrylic acid and itaconic acid.

(M-3) A (meth)acrylic monomer other than the above (M-1) represented by the formula $$\begin{matrix} R^2 \\ | \\ CH_2=C-X \end{matrix} \qquad (II)$$

wherein $R^2$ represents a hydrogen atom or methyl group, and X represents an aryl group having 6 to 8 carbon atoms (for example, phenyl, tolyl, ethylphenyl, xylyl, etc.), nitrile group, $-COOR^3$ group or $-O-COR^4$ group wherein $R^3$ represents a straight-chain or branched chain alkyl group having 1 to 20, preferably 1 to 4 carbon atoms, straight-chain or branched chain alkenyl group having 10 to 20, cycloalkyl group having 6 to 8, particularly 6 or 7 carbon atoms, or aralkyl group having 7 to 20 carbon atoms, and $R^4$ represents a hydrogen atom or straight-chain or branched chain alkyl group having 1 to 12: For example, vinyl aromatic compounds such as styrene, $\alpha$-methylstyrene, vinyltoluene and ethylbenzene, acrylonitrile, methacrylonitrile; (meth)acrylic esters such as methyl (meth)acrylate, ethyl methacrylate, propyl methacrylate, isopropyl methacrylate, butyl methacrylate, isobutyl methacrylate, tert-butyl (meth)acrylate, pentyl methacrylate, hexyl methacrylate, octyl methacrylate, 2-ethylhexyl methacrylate, nonyl methacrylate, isononyl methacrylate, decyl methacrylate, isodecyl methacrylate, dodecyl methacrylate, tridecyl (meth)acrylate, hexadecyl (meth)acrylate, octadecyl (meth)acrylate, 9-octadecenyl (meth)acrylate, cyclohexyl methacrylate and benzyl (meth)acrylate; vinyl esters such as vinyl formate, vinyl acetate, vinyl propionate and vinyl Versatate (trade name), etc. Preferred among them are those of the above formula (II) wherein X represents a phenyl group, nitrile group or $-COOR^3$ group, and particularly styrene, acrylonitrile and methyl methacrylate.

(M-4) Another monomer having at least one radical polymerizable unsaturated group in the molecule: For example, (meth)acrylamides such as (meth)acrylamide, diacetoneacrylamide and N-methylol (meth)acrylamide; esters of (meth)acrylic acid and epoxy alcohol such as glycidyl (meth)acrylate; $C_{2-3}$ hydroxyalkyl (meth)acrylate such as 2-hydroxyethyl (meth)acrylate and 2-hydroxypropyl (meth)acrylate; mono- or di-($C_{1-2}$ alkyl) amino- $C_{2-3}$ alkyl (meth)acrylate such as mono- or di-methylaminoethyl (meth)acrylate and mono- or di-ethylaminoethyl (meth)acrylate; monomers having 2 to 3 radical-polymerizable unsaturated groups such as divinylbenzene, diallyl phthalate, triallyl cyanurate, ethylene glycol di(meth)acrylate, 1,4-butanediol di(meth)acrylate, 1,6-hexanediol di(meth)acrylate, diethylene glycol di(meth)acrylate and allyl (meth)acrylate, etc. Suitable among them are (meth)acrylamides, $C_{2-3}$ hydroxyalkyl (meth)acrylates, monomers having 2 to 3 radical-polymerizable unsaturated groups. It is desired that the copolymerization rate of the above monomers is in the following range based on the total amount of the monomers, as change amounts at the time of polymerization of the acrylic polymer (A).

Monomer (M-1): generally 40 to 99.5 weight %, preferably 45 to 95 weight % and more preferably 50 to 90 weight %;

Monomer (M-2): generally 0.5 to 20 weight %, preferably 1 to 15 weight % and more preferably 2 to 10 weight %;

Monomer (M-3): generally 0 to 59.5 weight %, preferably 10 to 54 weight % and more preferably 20 to 48 weight %;

Monomer (M-4): generally 0 to 5 weight %, and preferably 0 to 3 weight %.

Acrylic polymer (B):

As the acrylic polymer (B) constituting the skin layer part of the composite particles of this invention is used one having a glass transition temperature (Tg) of $-10°$ C. or less. When an acrylic polymer having Tg of $-10°$ C. or more is used in the skin layer part, the rubber elasticity of the resulting coat tends to be lost, and particularly, low-temperature resistance to chipping tends to lower. Thus desirably, the acrylic polymer (B) constituting the skin layer part has Tg in the range of generally $-100°$ C. to $-20°$ C., particularly $-90°$ C. to $-30°$ C.

Further, the acrylic polymer (B) can have a weight average molecular weight of generally 500,000 or more and preferably 1,000,000 or more.

As for the acrylic polymer (B), although as far as its Tg is in the above range, the composition of the monomers constituting the polymer is not particularly limited, usually an acrylic (co)polymer is suitable obtained by (co)polymerizing at least one of the above monomers (M-1) as an essential component, if necessary in combination with one or plural members selected from the above monomers (M-2), (M-3) and (M-4).

Thus suitably mentioned as monomer components constituting the polymer (B) are combinations of a $C_{4-9}$ alkyl ester of acrylic acid represented by butyl acrylate or 2-ethylhexyl acrylate as monomer (M-1); acrylic acid or methyacrylic acid as monomer (M-2); and styrene, a $C_{1-4}$ alkyl ester of (meth)acrylic acid such as methyl methacrylate, or vinyl Versatate (trade name) as monomer (M-3).

When the polymer (B) contains monomer (M-2) as a constitutive monomer, it is desirable that the content of monomer (M-2) in the polymer (B) is 50 weight % or less, inferably 30 weight % or less and more preferably 20 weight % or less based on the total-amount of monomer (M-2) in the polymers (A) and (B).

It is desirably that the constitutive rate of monomers constituting the acrylic polymer (B) is, as a charge amount at the time of polymerization of the acrylic polymer (B), in the following range based on the total amount of the monomers.

Monomer (M-1): generally 50 to 100 weight % and preferably 70 to 100 weight %;

Monomer (M-2): generally 0 to 10 weight % and preferably 0 to 5 weight %;

Monomer (M-3): generally 0 to 50 weight % and preferably 0 to 30 weight %;

Monomer (M-4): generally 0 to 5 weight % and preferably 0 to 3 weight %.

Composite particles

The dispersed fine particles in the aqueous dispersion of this invention are composite particles having a core-skin structure composed of the core part mainly comprising the previously stated acrylic polymer (A) and the skin layer part mainly comprising the above acrylic polymer (B). Although the core part can substantially consist of the acrylic polymer (A) alone, in some case, a small amount of the acrylic polymer (B) may be mixed therein. Further, although the skin part can substantially consist of the acrylic polymer (B) alone, in some case, a small amount of the acrylic polymer (A) may be mixed therein.

The ratio of the acrylic polymers (A) and (B) in the dispersed composite particles can be varied in accordance with characteristics desired for the final aqueous dispersion. Generally, the polymer (A) can be in the range of 50 to 95 weight %, preferably 60 to 90 weight % and more preferably 70 to 90 weight %, and the polymer (B) can be in the range of 50 to 5 weight %, preferably 40 to 10 weight % and more preferably 30 to 10 weight %, based on the weight of the composite particles, respectively. When the rate of the polymer (A) in the particle are less than 50 weight %, problems of occurrence of agglomerate, destruction of the emulsion state, lowering of storage stability of the resulting aqueous dispersion, etc. are liable to occur, and on the other hand the rate goes beyond 95 weight %, there arises a tendency that the effect of the polymer (B) is slow to occur, the resulting coat becomes too hard and low-temperature resistance to chipping lowers.

Further, it is desirable that the polymers (A) and (B) are selected, respectively so that the composition of all the monomers constituting the composite particles of the invention is in the following range.

Monomer (M-1): generally 40 to 90 weight %, preferably 45 to 85 weight % and more preferably 50 to 80 weight %:

Monomer (M-2): generally 0.5 to 10 weight %, and preferably 1 to 5 weight %;

Monomer (M-3): generally 0 to 60 weight %, preferably 15 to 55 weight % and more preferably 20 to 50 weight %;

Monomer (M-4): generally 0 to 5 weight % and preferably 0 to 3 weight %.

Further, it is important to select and combine the acrylic polymer (A) constituting the core part with the acrylic polymer (B) constituting the skin layer part so that the glass transition temperature of the polymer (A) (hereinafter referred to as $Tg_A$) is higher than the glass transition temperature of the polymer (B) (hereinafter referred to as $Tg_B$). If this condition is not obeyed, it becomes difficult to obtain a chipping-resistant aqueous coating composition satisfying normal- and low-temperature resistances to chipping each at a high level.

In order to sufficiently display the desired effect, it is desirable that $Tg_A$ is higher than $Tg_B$ by 10° C. or more, further by 15° to 100° C.

It is preferred that the composite particles in the aqueous dispersion of the invention are substantially spherical particles composed of the core part comprising acrylic polymer (A) and the skin layer part comprising the acrylic polymer (B) covering the core part, and the average particle size of the particles can be in the range of generally 0.05 to 0.5 micron preferably 0.1 to 0.4 micron. In this connection, the average particle size of the composite particles is a value measured by the DLS method.

Further, it is desirable that the skin layer part is uniformly covering the surface layer part of the core part, but in some case, the skin layer can cover the core part partially, for example in a network sate or insular state.

The dispersed composite particles of the invention exhibit an acidic property due to the carboxyl group-containing acrylic polymer (A) mainly constituting the core part, and the carboxyl group content of the particles can be in the range of usually 5 to 150 mg equivalents, particularly 10 to 75 mg equivalents per 100 g of the composite particles, as measured by the conductometric titration method.

The carboxyl group content of the acrylic polymer (A) can be measured by taking a sample at the time when formation of an emulsion of the polymer (A) ceased in the step of preparation of the aqueous dispersion and then subjecting it to the conductometric titration method.

Aqueous medium:

The aqueous medium as a dispersion medium for dispersing the above-described composite particles of the invention is usually water, but in some case it is also possible to use a mixed solvent of water with a water miscible organic solvent.

Preparation of the aqueous of the invention:

The aqueous dispersion of the invention can be prepared by a multi-stage emulsion polymerization method known per se such as the so-called seed polymerization method. For example, the aqueous dispersion of the invention can be prepared by (1) a step which comprises emulsion polymerizing the above monomers (M-1), (M-2), (M-3) and (M-4) in a rate necessary for forming a polymer (A), in an aqueous medium and in the presence of surfactant and/or a protective colloid to give an emulsion of the acrylic polymer (A), and (2) a step which comprises continuing the emulsion polymerization with one-step or multi-step addition of monomers (M-1), (M-2), (M-3) and (M-4) in a rate necessary for forming a polymer (B) to the formed acrylic polymer (A).

Any of nonionic, anionic, cationic and amphoteric surfactants can be used as the surfactant in the above step (1), but usually anionic surfactants are suitable. Examples of usable anionic surfactants are fatty acid salts such as sodium stearate, sodium oleate and sodium laurate; alkylarylsulfonic acid salts such as sodium dodecylbenzenesulfonate; alkyl sulfate ester salts such as sodium lauryl sulfate; alkyl sulfosuccinate ester salts such as sodium monoactyl sulfosuccinate, sodium dioctyl sulfosuccinate and sodium polyoxyethylenelauryl sulfosuccinate; polyoxyalkylene alkyl ether sulfate ester salts such as sodium polyoxyethylene lauryl ether sulfate; polyoxyalkylene alkylaryl ether sulfate ester salts such as sodium polyoxyalkylene nonylphenol ether sulfate; etc.

Further, in the invention, a reactive anionic surfactant can suitably be used as the surfactant, too, and examples of such reactive surfactants are sulfosuccinic acid salt-type reactive anionic surfactants represented by the following formulae

 (III)

 (IV)

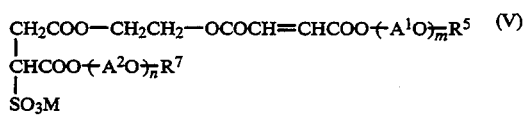 (V)

; alkenylsuccinic acid salt-type reactive anionic surfactants represented by the following formulae

 (VI)

 (VII)

, etc.

In the above formulae (III) to (VII), $R^5$ and $R^7$ each represent a $C_{1-30}$ hydrocarbon group (for example, an alkyl group, alkenyl group, cycloalkyl group, aryl group or aralkyl group or the like) or a carboxylic acid residue (for example, a $C_{3-8}$ aliphatic carboxylic residue, $C_{7-12}$ aromatic carboxylic acid residue or $C_{4-10}$ alicyclic carboxylic acid residue or the like); $R^6$ represents a $C_{2-4}$ alkenyl group or $C_{3-5}$ aliphatic unsaturated carboxylic acid residue; $A^1$ and $A^2$ each represent a $C_{2-4}$ alkylene group optionally having a hydroxyl group; m is an integer of 0 to 100, n is an integer of 0 to 10; and M represents a monovalent cation (for example, an alkali metal ion, ammonium ion, organic amine base or organic quaternary ammonium base or the like).

As specific examples of such sulfosuccinic acid salt-type reactive anionic surfactants, there can be exemplified Latemul S-120, S-120A, S-180 and S-180A (trade names, produced by Kao Co., Ltd.), Eleminol JS-2 (trade name, produced by Sanyo Kasei Co., Ltd.), etc., and as specific examples of such alkenylsuccinic acid salt-type reactive anionic surfactants, there can be exemplified Latemul ASK (trade name, produced by Kao Co., Ltd.), etc.

Further, as reactive anionic surfactants capable of being suitably used in the invention, there can be mentioned $C_{3-5}$ aliphatic unsaturated carboxylic acid sulfoalkyl ($C_{1-4}$) ester-type surfactants, for example, (meth)acrylic acid sulfoalkyl ester salt-type surfactants such as 2-sulfoethyl (meth)acrylate sodium salt and 3-sulfopropyl (meth)acrylate ammonium salt; and aliphatic unsaturated dicarboxylic acid alkyl sulfoalkyl diester salt-type surfactants such as sulfopropylmaleic acid alkyl ester sodium salt, sulfopropylmaleic acid polyoxyethylene alkyl ester ammonium salt and sulfoethylfumaric acid polyoxyethylene alkyl ester ammonium salt.

Still further, as reactive anionic surfactants, there can also, for example, be used maleic acid dipolyethylene glycol ester alkylphenol ether sulfuric acid ester salts, phthalic acid dihydroxyethyl ester (meth)acrylate sulfuric acid ester salt, 1-allyloxy-3-alkylphenoxy-2-polyoxyethylene sulfuric acid ester salts [Adecaria Soap SE-10N (trade name), produced by ASAHI DENKA KOGYO K.K.], polyoxyethylene alkylalkenylphenol sulfuric acid ester salts [Aquarone (trade name), produced by Daiichi Kogyo Seiyaku Co., Ltd.], etc.

Such reactive anionic surfactants can be used in an appropriate combination with the above-mentioned usual (non-reactive) anionic surfactant.

Further, the above reactive and/or non-reactive anionic surfactants can further be used together with a small amount of a nonionic surfactant. Examples of usable nonionic surfactants are polyoxyalkylene alkyl ethers such as polyoxyethylene lauryl ether and polyoxyethylene stearyl ether; polyoxyalkylene alkylphenol ethers such as polyoxyethylene octylphenol ether and polyoxyethylene nonylphenol ether; sorbitan fatty acid esters such as sorbitan monolaurate, sorbitan monostearate and sorbitan trioleate; polyoxyalkylene sorbitan fatty acid esters such as polyoxyethylene sorbitan monolaurate; polyoxyalkylene fatty acid esters such as polyoxyethylene monolaurate and polyoxyethylene monostearate; glycerol fatty acid esters such as oleic acid monoglyceride and stearic acid monoglyceride; polyoxyethylene polypropylene block copolymer; etc.

These surfactants can be used alone or in an appropriate combination. Preferred among these surfactants are, for example, polyoxyalkylene alkyl ethers, polyoxyalkylene alkylphenol ethers, etc.

The use amount of the above surfactants can be varied in accordance with the kind of surfactants to be used, the kind of monomers to be used, etc., but in general can be in the range of about 0.3 to about 10 weight parts, preferably about 0.5 to about 5 weight parts and more preferably about 1 to about 3 weight parts per 100 weight parts of the total of monomers used for formation of the polymers (A) and (B).

On the other hand, examples of protective colloids usable in the above step (1) are polyvinyl alcohols such as partially saponified polyvinyl alcohol, completely saponified polyvinyl alcohol and modified polyvinyl alcohols; cellulose derivatives such as hydroxyethylcellulose, hydroxypropylcellulose and carboxymethylcellulose salts; natural polysaccharides such as guar gum; etc.

These protective collids may be used alone or in combination with the above surfactants. Although depending on use conditions, its use amount can usually be in the range of about 0 to about 3 weight parts per 100 weight parts in total of the monomers used for forming the polymers (A) and (B).

Examples of polymerization initiators usable for emulsion polymerization of the above step (1) are persulfate salts such as ammonium persulfate, potassium persulfate and sodium persulfate; organic peroxides such as t-butyl hydroperoxide, cumene hydroperoxide and p-menthane hydroperoxide; hydrogen peroxide; etc., and they can be used alone or in a combination of plural members thereof.

The use amount of the polymerization initiator is not strict and can appropriately be selected, but in general can, for example, be in the range of about 0.05 to about 1 weight part, preferably about 0.1 to about 0.7 weight part and more preferably about 0.1 to about 0.5 weight part per 100 weight parts in total of monomers used for forming the polymer (A).

Further, in emulsion polymerization of the above step (1), a reducing agent can, if desired, be used together. Examples of usable reducing agents are reducing organic compounds such as, for example, ascorbic acid, tartaric acid, citric acid and glucose; and reducing inorganic compounds such as sodium thiosulfate, sodium sulfite, sodium bisulfite and sodium metabisulfite.

The use amount of such a reducing agent can appropriately be selected, too, and usually can, for example, be in the range of about 0.05 to about 1 weight part per 100 weight parts in total of the monomers used for forming the polymer (A).

Still further, in emulsion polymerization of the above step (1), a chain transfer agent can also be used, if desired. Examples of such chain transfer agents are cyanoacetic acid; $C_{1-8}$ alkyl esters of cyanoacetic acid; bromoacetic acid; $C_{1-8}$ alkyl esters of bromoacetic acid; aromatic compounds such as anthracene, phenanthrene, fluorene, and 9-phenylfluorene; aromatic nitro compounds such as p-nitroaniline, nitrobenzene, dinitrobenzene, p-nitrobenzoic acid, p-nitrophenol and p-nitrotoluene; borane derivatives such as tributylborane; halogenated hydrocarbons such as carbon tetrabromide, carbon tetrachloride, 1,1,2,2-tetrabromoethane, tribromoethylene, trichloroethylene, bromotrichloromethane, tribromomethane and 3-chloro-1-propene; aldehydes such as chloral and furaldehyde; alkylmercaptans having 1 to 18 carbon atoms; aromatic mercaptans such as thiophenol and toluenemercaptan; mercaptoacetic acid; $C_{1-10}$ alkyl esters of mercaptoacetic acid; hydroxyalkylmercaptans having 1 to 12 carbon atoms; terpenes such as pinene and terpinolene; etc.

When the chain transfer agent is used, it is preferred that its use amount is in the range of about 0.005 to about 3.0 weight parts per 100 weight parts in total of the monomers used for forming the polymer (A).

As a suitable process when the above step (1) is practiced is mentioned a process which comprises successively adding monomers forming a polymer (A), a surfactant and/or a protective colloid, a polymerization initiator, and other components to be used at need to an aqueous medium which may appropriately contain a surfactant and/or a protective colloid.

The emulsion polymerization of the step (1) can be carried out at a temperature of generally about 30° to about 100° C. and preferably about 40° to about 90° C. Thereby, an emulsion of a carboxyl group-containing acrylic polymer (A) can be formed.

Then in the step (2), monomers for forming a polymer (B) are added to the thus obtained polymer (A) to further continue emulsion polymerization. This second-step step emulsion polymerization is carried out substantially without further adding a surfactant and/or a protective colloid.

For example, the second-step polymerization can be carried out by successively adding monomer components necessary for forming a polymer (B), a polymerization initiator, and other components to be used at need, for example a reducing agent or a chain transfer agent into the emulsion of the polymer (A) obtained by the step (1).

The polymerization initiator used in this second-stage polymerization can be selected from those above-mentioned about the step (1). Although its use amount is not particularly limited, usually, it can for example be in the range of about 0.05 to about 1 weight parts, preferably about 0.1 to about 0.7 weight parts and more preferably about 0.1 to 0.5 weight parts per 100 weight parts in total of the monomers for forming the polymer (B). Further, the reducing agent and chain transfer agent, when used, can be used in the same rate as in the polymer (A).

Further, the emulsion polymerization at the second step of the step (2) can generally be carried out at a temperature of about 30° to about 100° C. and preferably about 40° to about 90° C.

An aqueous dispersion of this invention can be prepared by the thus described multi-stage emulsion polymerization. The solid component concentration of the resulting aqueous dispersion is not particularly limited and can be varied over a wide range depending on use, easiness of handling, etc., but it is suitable that the solid component concentration is in the range of generally about 10 to about 70 weight %, preferably about 30 to about 65 weight % and more preferably about 40 to about 60 weight %.

Further, the aqueous dispersion can, usually, have a pH in the range of 2 to 10 and preferably 2 to 8, and further a viscosity (a B-type rotational viscometer, 25° C., 20 rpm) in the range of about 10 to about 10,000 cps and preferably about 50 to about 5,000 cps.

The adjustment of the pH of the aqueous dispersion can be by adding to the aqueous dispersion ammonia water, an water soluble amine, an aqueous alkali hydroxide solution or the like.

The aqueous dispersion provided by this invention is an aqueous dispersion of fine acrylic polymer particles wherein composite particles composed of the core part mainly comprising the carboxyl group-containing acrylic polymer (A) and the skin layer part mainly comprising the acrylic polymer (B) covering the core part are stably dispersed in an aqueous medium. For example, the aqueous dispersion can advantageously be utilized in a coating composition such as a mastic coating, a sound insulating coating, a vibration-proof coating or a caulking material, and particularly in a chipping resistant aqueous coating composition.

The aqueous dispersion of the invention can particularly advantageously be used as a vehicle component in a chipping-resistant aqueous coating composition.

Thus, this invention also provides a chipping resistant aqueous coating composition comprising the aqueous dispersion of the invention and an inorganic filler.

The inorganic filler is compounded with the composition of the invention for the purpose of bulking, adjustment of hardness of the coat, prevention of occurrence of blister, etc. As usable inorganic fillers can be exemplified inorganic solid powders substantially insoluble or sparingly soluble to water, for example, calcium carbonate, silica, alumina, kaolin, clay, talc, diatom earth, mica, aluminum hydroxide, glass powder, barium sulfate, magnesium carbonate, etc.

The compounding amount of these inorganic fillers can be varied in a wide range depending on their kinds, physical properties desired for coating compositions, etc., but can be in the range of generally 100 to 390 weight parts, preferably 120 to 380 weight parts and more preferably 150 to 300 weight parts per 100 weight parts of the solid components of the above aqueous dispersion, namely the total amount of the composite particles.

Further, the inorganic filler is desirably one having an average particle size in the range of generally about 1 to about 50 microns and particularly about 5 to about 30 microns.

The coating composition of this invention can, if necessary, contain a rust-inhibiting pigment, a colorant, a crosslinking agent, etc., as is the case with conventional coating compositions.

Examples of rust-inhibiting pigments are red lead; chromic acid metal salts such as zinc chromate, barium chromate and strontium chromate; phosphoric acid metal salts such as zinc phosphate, calcium phosphate, aluminum phosphate, titanium phosphate and silicon phosphate and ortho- or condensed-phosphate salts of these metals; molybdic acid metal salts such as zinc molybdate, calcium molybdate, calcium zinc molybdate, potassium zinc molybdate, potassium zinc phosphomolybdate and potassium calcium phosphomolybdate; boric acid metal salts such as calcium borate, zinc borate, barium borate, barium metaborate and calcium metaborate; etc. Preferred among these rust-inhibiting pigments are nontoxic or low toxic rust-inhibiting pigments such as phosphoric acid metal salts, molybdic acid metal salts and boric acid metal salts.

The compounding amount of the rust-inhibiting pigment can for example be in the range of 0 to 50 weight parts and preferably 5 to 30 weight parts per 100 weight parts of the solid components of the aqueous dispersion.

Further, as coloring pigments can be mentioned organic or inorganic coloring pigments such as, for example, titanium oxide, carbon black, red oxide, Hansa Yellow, Benzidine Yellow, Phthalocyanine Blue and Quinacridone Red. The compounding amount of these coloring pigments can for example be in the range of 0 to 10 weight parts and preferably 0.5 to 5 weight parts per 100 weight parts of the solid components of the aqueous dispersion.

It is preferred that the particle size of these rust-inhibiting pigments and coloring pigments is in the range of 1 to 50 microns in view of smoothness of coat formed from the resulting coating composition, etc.

Further, crosslinking agents capable of appropriate compounding include (a) water soluble polyvalent metal salts, for example, zinc salts such as zinc acetate, zinc formate, zinc sulfate and zinc chloride; aluminum salts such as aluminum acetate, aluminum nitrate and aluminum sulfate; calcium salts such as calcium acetate, calcium formate, calcium chloride, calcium nitrate and calcium nitrite; barium salts such as barium acetate, barium chloride and barium nitride; magnesium salts such as magnesium acetate, magnesium formate, magnesium chloride, magnesium sulfate, magnesium nitrate and magnesium nitrite; lead salts such as lead acetate and lead formate; nickel salts such as nickel acetate, nickel chloride, nickel nitrate and nickel sulfate; manganese salts such as manganese acetate manganese chloride, manganese sulfate and manganese nitrate; copper salts such as copper chloride, copper nitrate and copper sulfate; etc., (b) aziridine components, for example, reaction products of a polyisocyanate compound with ethyleneimine, (c) polyisocyanate compounds, for example, acromatic diisocyanate compounds such as m- or p-phenylene diisocyanate, 2,4- or 2,6-tolylene diisocyanate, m- or p-xylylene diisocyanate and 4,4'-diphenylmethane diisocyanate; aliphatic or alicyclic diisocyanate compounds such as hexamethylene diisocyanate, isophorone diisocyanate, hydrogenated products of the above aromatic diisocyanate compounds and dimer acid diisocyanate; dimers or trimers of these isocyanates; adducts of these isocyanates with di- or trihydric polyols such as, for example, ethylene glycol and trimethylolpropane; etc., (d) water soluble epoxy resins, for example, glycerol diglycidyl ether, etc., (e) water soluble melamine resins, for example, methylolmelamine; products obtained by etherifying at least part of the hydroxyl groups of the methylolmelamines with methyl alcohol ethyl alcohol, n-butyl alcohol or the like; etc., (f) water-dispersible blocked isocyanates, for example, trimethylolpropane tritolylene diisocyanate methyl ethyl ketoxime adduct; adducts of the above polyisocyanate compounds with volatile low molecular weight active hydrogen-containing compounds; etc.

As the above volatile low molecular weight active hydrogen-containing compounds, there can be exemplified, for example, aliphatic, alicyclic or aromatic alcohols such as methyl alcohol, ethyl alcohol, n-butyl alcohol, cyclohexyl alcohol, benzyl alcohol, ethylene glycol monoethyl ether, ethylene glycol monobutyl ether and phenol; hydroxy-tertiaryamines such as dimethylaminoethanol and diethylaminoethyanol; ketoximes such as acetoxime and methyl ethyl ketoxime; active methylene compounds such as acetylacetone, acetoacetic acid ester and malonic acid esters; lactams such as ε-caprolactam; etc.

The use amount of these crosslinking agents can for example be in the range of e.g. 0 to 10 weight parts, preferably 0.5 to 10 and particularly preferably 1 to 5 weight parts per 100 weight parts of the solid components of the above aqueous dispersion, in view of restraint of change with time lapse of the viscosity of the coating composition to be obtained.

There can, further if necessary, be added and mixed into the chipping-resistant aqueous coating composition a dispersing agent such as an inorganic dispersing agent (for example, sodium hexametaphosphate, sodium tripolyphosphate, etc.) or an organic dispersing agent [for example, Nopuco Sparce 44C (trade name, polycarboxylic acid type; produced by Sunnopuco Co.)]; a silicone or another type of antifoaming agent; a thickener and a viscosity improver such as polyvinyl alcohol, a cellulose derivative, a polycarboxylic acid resin or a surfactant; an organic solvent such as ethylene glycol, butyl cellosolve, butyl carbitol or butyl carbitol acetate; an age resister; an antisepticofungicide; an ultraviolet absorber; an antistatic agent; and the like.

Although particularly limited thereto, the chipping resistant aqueous coating composition can, generally, contain solid components in the range of about 10 to about 85 weight %, preferably about 30 to about 80 weight % and particularly preferably about 50 to about 70 weight %, have a pH in the range of 7 to 11 and preferably 8 to 10, and have a viscosity (a B-type rotational viscometer, 25° C., 20 rpm) in the range of about 3,000 to about 100,000 cps and preferably about 5,000 to about 50,000 cps.

Base materials to which the chipping-resistant aqueous coating composition of this invention is applicable are not particularly limited, and examples thereof are steel sheets; various plated steel sheets such as lead-tin alloy-plated steel sheets (monosheet steel sheets), tin-plated steel sheets, aluminum-plated steel sheets and lead-plated steel sheets, chromium-plated steel sheets, nickel-plated steel sheets; coated steel sheets such as electrodeposition-coated steel sheets; etc.

The coating composition of the invention can suitably be used for coating the electrodeposition-coated faces, intermediate coat-coated faces or top coat-coated faces, etc. of products obtained by molding and processing such base materials into various shaped using a sheet metal press and various automobile members obtained by welding them, for example, the sheet metal working members outside automobiles such as, for example, gasoline tank, the back side of the flooring, tire houses, front aprons and rear aprons.

The application of the coating composition of this invention can be carried out by a coating method known per se such as, for example, brush coating, spray coating or roller coating, but airless spray coating is generally suitable.

The thickness of the coat at that time is varied depending on use of base materials, etc., but is suitably in the range of usually about 200 to about 800 microns and particularly about 300 to about 600 microns. Further, drying of the coat can be carried out by natural drying, drying with heating or the like, but in general, it is convenient that the coat is preliminarily dried at a temperature of about 60° to about 100° C. and then dried with heating in a furnace of a temperature of the order of about 120° to about 160° C.

This invention is further specifically described below according to examples. Various physical properties in the present specification were measured by the following methods.

Glass transition temperature (Tg):

About 10 mg of an aqueous dispersion of a polymer as a sample is weight and put in a cylindrical cell having an inner diameter of about 5 mm and a depth of about 5 mm and made of aluminum foil having a thickness of about 0.05 mm and dried at 100° C. for 2 hours. The resulting dried sample is used as measurement sample. Tg is determined by measurement with a temperature increase rate of 10° C./min form $-150°$ C. using a differential scanning calorimeter (Model SSC-5000 produced by Seiko Instruments Inc.).

Since when two-layer particles composed of a core part and a skin layer part, for example the acrylic polymer composite particles contained in the aqueous dispersion of this invention, two different Tg values can be measured according to the about Tg measurement method, $Tg_A$ is assigned to the higher Tg value and $Tg_B$ is assigned to the lower Tg value.

Although when an aqueous dispersion is used wherein plural acrylic polymer emulsions having different Tg values are blended, plural Tg values are observed as is the above case, film derived from such an aqueous dispersion has a high turbidity and thus such an aqueous dispersion can be distinguished from the aqueous dispersion of this invention through the later-mentioned film turbidity test.

Further, in case of composite particles, Tg measurement results about composite particles wherein the polymer of $Tg_A$ consitutes the skin part and the polymer of $Tg_B$ constitutes the core part, which is reverse to the composite particles of this invention, are the same results as in the composite particles of this invention, and thus it is impossible to determine according to Tg measurement alone which polymer constitute the skin layer part. However, in case of the composite particles of this invention the Tg value of the polymer constituting the skin layer part is relatively low, carbon black, etc. tend to easily adhere to the resulting film, compared to a polymer obtained by emulsion polymerizing uniformly (without forming core and skin layer parts) all the monomer compositions of the polymers (A) and (B) constituting the composite particles. Therefore, the composite particles of this invention can be distinguished by comaring the degree of adhesion of carbon black according to the later-described carbon black adhesion test.

Turbidity of film:

An aqueous dispersion is applied onto a washed glass plate using a 20-mil doctor blade, dried by leaving it to stand for 16 hours in a constant temperature and constant humidity chamber of 20° C. and 65% RH, and further dried at 120° C. for 20 minutes to form a polymer film. This film is measured for turbidity using "Haizumeter TC-HIIIDP" produced by Tokyo Denshoku Co., Ltd.

Carbon black adhesion test:

① Preparation of a sample

An aqueous dispersion is applied onto a washed glass plate using a 20-mil doctor blade and dried by allowing to stand for 24 hours or more in a constant temperature and constant humidity chamber of 20° C. and 65% RH to form a polymer film.

② Adhesion of carbon black

Carbon black prescribed in JIS Z-8901 is applied with a brush, under a circumstances of 20° C. and 65% RH, onto the polymer film prepared in the above ①. Then excess carbon black was removed by blowing away it with an air pressure of 5 Kg/cm² to obtain a polymer film to which carbon black adhered.

③ Evaluation method

The polymer film prepared in ① and the polymer film which was obtained in ② and to which carbon black adhered were measured for whiteness, with application of a white standard plate on the back, using a photoelectric colorimeter [Color Analyzer TC-1800 MKZ (trade name), produced by Tokyo Denshoku Co., Ltd.], and then the percentage of whiteness lowering (%) is calculated according to the following equation.

Percentage of whiteness lowering (%)=

$$\frac{L_1 - L_2}{L_1} \times 100$$

wherein $L_1$ represents whiteness of the polymer film prepared in ① and $L_2$ represents whiteness of the polymer film which was obtained in ② and to which carbon black adhered.

viscosity:

Measured by a B-type rotational viscometer under conditions of 25° C. and 20 rpm.

Carboxyl group content:

About 10 g of an aqueous dispersion of a polymer is accurately weighed, diluted with about 300 g of deionized water and adjusted to pH 3 or less by treatment with an ion exchange resin, and the resulting dispersion is used as a sample. The sample is titrated with a 0.5N aqueous sodium hydroxide solution using an autographically recording type automatic electric conductivity titration apparatus, and the carboxyl group content per 100 g of the polymer is determined on calculation.

Average particle size:

An aqueous dispersion of a polymer is diluted 50,000 to 150,000-fold with distilled water, and after sufficient stirring and mixing, about 10 ml of the dilution is sampled into a 21 mmφ glass cell using a Pasteur pipette. The resulting glass cell is set in the prescribed position of a dynamic light scattering photometer DLS-700 (produced by Otsuka Denshi Co., Ltd.), and measurement is carried out under the following measurement conditions.

| Measurement condition | |
|---|---|
| Measurement temperature | 25 ± 1° C. |
| Clock rate | 10 μsec (or micro sec) |
| Corelation channel | 512 |
| Number of times of integrating measurement | 200 times |
| Light scattering angle | 90° |

The results of the above measurement are computer-treated to determine an average particle size.

Further, methods for preparation and test of test samples used in the following example and comparative examples are as follows.

(1) Preparation of specimens

The surfaces of monosheet steel sheets of 0.8 × 100 × 200 mm produced of NIPPON STEEL CORPORATION are coated with coating composition samples respectively to the prescribed thickness by the airless spraying coating method, and the coat is preliminarily dried at 80° C. for 15 minutes using a hot air circulating dryer and then heat treated at 120° C. for 20 minutes.

(2) Blister threshold coat thickness

The spray coating in the above item (1) is repeated except for variously changing the thickness of the dried coat, and thereby maximum coat thickness causing no blister at the time of drying is determined. The maximum coat thickness is used as blister threshold coat thickness.

(3) Normal-temperature resistance to chipping test

A specimen obtained by carrying out the coating step of the item (1) so that the thickness of dried coat is about 300μ is allowed to stand 3 hours under a constant temperature condition of about 25° C., and then measurement is carried out at the same temperature.

The specimen is fixed leaning it at an angle of 60° C. against the horizontal surface, and nuts (M-6) are successively dropped in the perpendicular direction on the coated side from a height of 2 m using a 20 m φ polyvinyl chloride pipe. Normal-temperature resistance to chipping is evaluated by the total weight of nuts dropped up to the time when the material of the monosheet steel sheet is exposed.

(4) Low-temperature resistance to chipping test

Measurement and evaluation are made in the same manner as in the above item (3) except that in the item (3) measurement is made at a temperature of −30° C. after a specimen is left as it is for 3 hours under a constant temperature condition of −30° C.

(5) Resistance to water

A specimen obtained by such coating in the item (1) that the thickness of the dried coat becomes about 300μ is immersed in deionized water of 40° C. for 7 days and taken out and the water is wiped out. Cutting lines of such a depth as reaching the base material at intervals of 1 mm in the longitudinal and horizontal directions are made on the surface using a cross-cut adhesion tester (produced by Suga Shikenki Co., Ltd.) to prepare 100 checkerbroad squares in 1 cm².

Cellophane tape 24 mm wide (produced by NICHIBAN COMPANY, LIMITED) is stuck on the checkerboard square, 180° quick peeling is made by hand, and the number of the remaining squares of the coat is counted. Resistance to water is expressed by the number of the remaining squares in the coat 100.

Example 1

Three hundred and twenty four grams of deionized water is charged into a 2-liter separable flask equipped with a stirrer, a reflux condenser and a thermometer, and the mixture was heated to 70° C. under nitrogen flow. Then into this separable flask were continuously added over a period of 3 hours 150 g of deionized water prepared in a separate vessel, 5 g of sodium dodecylbenzenesulfonate and 5 g of polyoxyethylene nonylphenyl ether (HLB about 16) as emulsifiers, a preemulsion comprising 204.75 g of butyl acrylate (BA), 134.75 g of methyl methacrylate (MMA) and 10.5 g of acrylic acid (AA) as a monomer mixed liquid ($M_A$), and 30 g of 5 weight % aqueous ammonium persulfate (APS) solution as an aqueous polymerization initiator solution, and thereafter the mixture was held at the same temperature for 1 hour to obtain an emulsion comprising the acrylic polymer A. Part of this emulsion was taken out and measured for the carboxylic acid content of the polymer A by the aforementioned electric conductivity titration method.

Then to this acrylic polymer emulsion were continuously added over a period of 1 hour a monomer mixed liquid ($M_B$) obtained by uniformly mixing 120 g of 2-ethylhexyl acrylate (2EHA), 25.5 g of styrene (St) and 4.5 g of AA, and 10 g of a 5 weight % aqueous APS solution while the mixture is maintained at 70° C., and then the mixture was held at the same temperature for 2 hours to obtain an aqueous dispersion comprising the composite particles of the acrylic polymer.

In the later-described Table 1 are shown the respective compositions of $M_A$ and $M_B$ in this polymerization, $Tg_A$ and $Tg_B$, the solid percentage, pH and viscosity of the resulting aqueous dispersion, the carboxylic acid content of the polymer A and composite particles, and the values of the turbidity and whiteness lowering percentage of the film obtained from the aqueous dispersion.

Examples 2 and 3 and Comparative example 1

The same procedure as in Example 1 was carried out except that the composition of the monomer mixture $M_B$ and the Tg value of the polymer B were changed in Example 1 to obtain an aqueous dispersion comprising the composite particles of the acrylic polymer. In the later-described Table 1 are shown the respective compositions of $M_A$ and $M_B$ in this polymerization, $Tg_A$ and $Tg_B$, the solid percentage, pH and viscosity of the resulting aqueous dispersion, the carboxylic acid content of the polymer A and composite particles, and the values of the turbidity and whiteness lowering percentage of the film obtained from the aqueous dispersion.

Example 4

The same procedure as in Example 1 was carried out except that the composition of the monomer mixture $M_A$ and the Tg value of the polymer A were changed in Example 1 to obtain an aqueous dispersion comprising the composite particles of the acrylic polymer. In the later-described Table 1 are shown the respective compositions of $M_A$ and $M_B$ in this polymerization, $Tg_A$ and $Tg_B$, the solid percentage, pH and viscosity of the resulting aqueous dispersion, the carboxylic acid content of the polymer A and composite particles, and the values of the turbidity and whiteness lowering percentage of the film obtained from the aqueous dispersion.

Examples 5 and 6

The same procedure as in Example 1 was carried out except that the composition of the monomer mixture $M_B$ was changed in Example 1 to obtain an aqueous dispersion comprising the composite particles of the acrylic polymer. In the later-described Table 1 are shown the respective compositions of $M_A$ and $M_B$ in this polymerization, $Tg_A$ and $Tg_B$, the solid percentage, pH and viscosity of the resulting aqueous dispersion, the carboxylic acid content of the polymer A and composite particles, and the values of the turbidity and whiteness lowering percentage of the film obtained from the aqueous dispersion.

Examples 7 and 8

The same procedure as in Example 1 was carried out except that the composition of the monomer mixture $M_A$ was changed in Example 1 to obtain an aqueous dispersion comprising the composite particles of the acrylic polymer. In the later-described Table 1 are shown the respective compositions of $M_A$ and $M_B$ in this polymerization, $Tg_A$ and $Tg_B$, the solid percentage, pH and viscosity of the resulting aqueous dispersion, the carboxylic acid content of the polymer A and composite particles, and the values of the turbidity and whiteness lowering percentage of the film obtained from the aqueous dispersion.

Examples 9 to 13

The same procedure as in Example 1 was carried out except that the use rate of the monomer mixtures $M_A$ and $M_B$ was changed in Example 1 to obtain an aqueous dispersion comprising the composite particles of the acrylic polymer. In the later-described Table 1 are shown the respective compositions of $M_A$ and $M_B$ in this polymerization, $Tg_A$ and $Tg_B$, the solid percentage, pH and viscosity of the resulting aqueous dispersion, the carboxylic acid content of the polymer A and composite particles, and the values of the turbidity and whiteness lowering percentage of the film obtained from the aqueous dispersion.

Example 14

The same procedure as in Example 11 was carried out except that the composition of the monomer mixtures $M_A$ and $M_B$ was changed and all the amounts of acrylic acid was used in $M_A$ in Example 11 to obtain an aqueous dispersion comprising the composite particles of the acrylic polymer. In the later-described Table 1 are shown the respective compositions of $M_A$ and $M_B$ in this polymerization, $Tg_A$ and $Tg_B$, the solid percentage, pH and viscosity of the resulting aqueous dispersion, the carboxylic acid content of the polymer A and composite particles, and the values of the turbidity and whiteness lowering percentage of the film obtained from the aqueous dispersion.

Example 15

The same procedure as in Example 14 was carried out except that the composition of the monomer mixture $M_A$ was changed in Example 14 to obtain an aqueous dispersion comprising the composite particles of the acrylic polymer. In the later-described Table 1 are shown the respective compositions of $M_A$ and $M_B$ in this polymerization, $Tg_A$ and $Tg_B$, the solid percentage, pH and viscosity of the resulting aqueous dispersion, the carboxylic acid content of the polymer A and composite particles, and the values of the turbidity and whiteness lowering percentage of the film obtained from the aqueous dispersion.

Example 16

The same procedure as in Example 15 was carried out except that 5 g of Adecalia Soap SE-10N (trade name, produced by ASAHI DENKA KOGYO K.K.) was used as an emulsifier in place of 5 g of sodium dodecylbenzenesulfonate in Example 15 to obtain an aqueous dispersion comprising the composite particles of the acrylic polymer. In the later-described Table 1 are shown the respective compositions of $M_A$ and $M_B$ in this polymerization, $Tg_A$ and $Tg_B$, the solid percentage, pH and viscosity of the resulting aqueous dispersion, the carboxylic acid content of the polymer A and composite particles, and the values of the turbidity and whiteness lowering percentage of the film obtained from the aqueous dispersion.

Comparative example 2

Into the same separable flask as in Example 1 was changed 324 g of deionized water and the mixture was heated to 70° C. under nitrogen flow. Then into this separable flask were continuously added over a period of 3 hours 150 g of deionized water prepared in a separate vessel, 5 g of sodium decylbenzensulfonate and 5 g of polyoxyethylene nonylphenyl ether (HLB about 16) as emulsifiers, a preemulsion comprising 204.75 g of BA, 134.75 of MMA, 120 g of 2EHA, 25.5 g of St and 15 g of AA as a monomer mixed liquid ($M_A$), and 40 g of a 5 weight % aqueous ammonium persulfate (APS) solution as an aqueous polymerization initiator solution, and the mixture was then held at the same temperature for 2 hours to obtain an acrylic polymer emlsion. In the later-described Table 1 are shown the solid percentage, pH and viscosity of the resulting emulsion, the carboxylic acid content of the polymer particles, and the values of the turbidity and whiteness lowering percentage of the film obtained from the aqueous dispersion.

Comparative example 3

The same procedure as in Comparative example 2 was carried out except the compositions of the monomer mixed liquid were changed to 292.5 g of BA, 192.5 g of MMA and 15 g of AA, and 400 g of 2EHA, 85 g of St and 15 g of AA, respectively in Comparative example 2 to obtain two kinds of acrylic polymer emulsions $S_1$ (the Tg value of the polymer is 0° C.) and $S_2$ (the Tg value of the polymer is $-40°$ C.). The obtained emulsions $S_1$ and $S_2$ were blended in a weight ratio of 70:30 to obtain an acrylic polymer aqueous dispersion. In the later-described Table 1 are shown in solid percentage, pH and viscosity of the resulting aqueous dispersion, the carboxylic acid content of the polymer A and composite particles, and the values of the turbidity and whiteness lowering percentage of the film obtained from the aqueous dispersion.

Comparative example 4

The same procedure as in Comparative example 2 was carried out except that the compositions of the monomer mixed liquid were changed in Comparative example 2 to 321 g of BA, 166 g of ethyl acylate (EA) and 13 g of AA, and 23 g of BA, 464 g of EA and 13 g of AA, respectively to obtain two kinds of acrylic polymer emulsions $S_3$ (the Tg value of the polymer is $-24°$ C.) and $S_4$ (the Tg value of the polymer is $-41°$ C.). The obtained emulsions $S_3$ and $S_4$ were blended in a weight ratio of 50:50 to obtain an acrylic polymer aqueous dispersion. In the later-described Table 1 are shown in solid percentage, pH and viscosity of the resulting aqueous dispersion, the carboxylic acid content of the polymer A and composite particles, and the values of the turbidity and whiteness lowering percentage of the film obtained from the aqueous dispersion.

Example 21

Two hundred weight parts of the aqueous dispersion prepared in Example 1 (about 100 weight parts as the solid components), 15 weight parts of 10 weight % sodium hexametaphosphate as a dispersant, 107 weight parts of powdered calcium carbonate (trade name: heavy calcium carbonate R, average particle size 10.3μ: produced by Maruo Calcium Co., Ltd.) as a filler, 20 weight parts of talc (trade name: P talc, average particle size 12μ: produced by Tsuchiya Kaolin Kogyo Co., Ltd.), 3 weight parts of carbon black, 20 weight parts of barium metaborate, 2 weight parts of about 25 weight % ammonia water and 54.2 weight parts of deionized water were uniformly mixed and dispersed using a disper to prepare a chipping-resistant aqueous coating composition wherein the rate (hereinafter, sometimes abbreviated as PWC) of total pigments (the total amounts of powdered calcium carbonate, talc and carbon black) in the coating composition is 60 weight % and the solid percentage is 60 weight %.

Various physical property tests were carried out using the obtained aqueous coating composition. The compounding composition of the aqueous coating composition and the results of measurement of various physical Properties are shown in the later-described Table 2.

Examples 22 and 23

The same procedure as in Example 21 was carried out except that PWC was changed by changing the use amount of calcium carbonate and in this relation the use amount of deionized water was changed in Example 21 to prepare various chipping-resistant aqueous coating compositions. Various physical property tests were carried out using the obtained aqueous coating compositions. The compounding composition of the aqueous coating composition and the results of measurement of various physical properties are shown in the latter described Table 2.

Examples 24 to 38 and Comparative examples 11 to 14

The same procedure as in Example 21 was carried out except that the aqueous dispersions prepared in Examples 2 to 16 and comparative examples 1 to 4 were used in place of using the aqueous dispersion prepared in Example 1 in Example 21 to prepare various chipping-resistant aqueous coating compositions. Various physical property tests were carried out using the obtained aqueous coating compositions. The compounding composition of the aqueous coating compositions and the results of measurement of various physical properties are shown in the latter described Table 2.

Example 39

Two hundred weight parts (about 100 weight parts as solid components) of the aqueous dispersion prepared in Example 1, 15 weight parts of 10 weight % sodium hexametaphosphate as a dispersant, 190 weight parts of powdered calcium carbonate (trade name: heavy calcium carbonate R, average particle size 10.3μ: produced by Maruo Calcium Co., Ltd.) as a filler, 20 weight parts of talc (trade name: P talc, average particle size 12μ: produced by Tsuchiya Kaolin Kogyo Co., Ltd.), 3 weight parts of carbon black, 20 weight parts of barium metaborate and 2 weight parts of about 25 weight % ammonia water were uniformly dispersed using a disper to prepare a chipping-resistant aqueous coating composition having PWC of 70 weight % and solid components of about 77 weight %.

Various physical property tests were carried out using the obtained aqueous coating composition. The compounding composition of the aqueous coating composition and the results of measurement of various physical properties are shown in the later-described Table 2.

Examples 40 to 43

The same procedure as in Example 39 was carried out except that, in Example 39, the aqueous dispersions prepared in Examples 11 and 14 to 16 were used in place of using the aqueous dispersion prepared in Example 1 to prepare various chipping-resistant aqueous coating compositions. Various physical tests were carried out using the obtained aqueous coating compositions. The compounding composition of the aqueous coating compositions and the results of measurement of various physical properties are shown in the later-described Table 2.

Example 44

The same procedure as in Example 43 was carried out except that, in Example 43, 2 weight parts of zinc acetate was further used as a crosslinking agent to prepare various chipping-resistant aqueous coating composition. Various physical property tests were carried out using the obtained aqueous coating composition. The coating composition of the aqueous coating composition and the results of measurement of various physical properties are shown in the later-described Table 2.

TABLE 1

(Part 1)

Item
Monomer composition

| | Core part (Polymer A) | | | | | | | | Skin layer part (Polymer B) | | | | | |
|---|---|---|---|---|---|---|---|---|---|---|---|---|---|---|
| | M-1 (wt %) | | M-2 (wt %) | | M-3 (wt %) | | | $Tg_A$ | M-1 (wt %) | | M-2 (wt %) | | M-3 (wt %) | |
| Experiment No. | 2EHA | BA | AA | MAA | MMA | St | AN | (°C.) | 2EHA | BA | AA | MAA | MMA | St |
| Example 1 | — | 58.5 | 3.0 | — | 38.5 | — | — | 0 | 80.0 | — | 3.0 | — | — | 17.0 |
| Example 2 | — | 58.5 | 3.0 | — | 38.5 | — | — | 0 | 61.0 | — | 3.0 | — | — | 36.0 |
| Example 3 | — | 58.5 | 3.0 | — | 38.5 | — | — | 0 | 92.0 | — | 3.0 | — | — | 5.0 |
| Example 4 | — | 72.5 | 3.0 | — | 24.5 | — | — | −20 | 80.0 | — | 3.0 | — | — | 17.0 |
| Example 5 | — | 58.5 | 3.0 | — | 38.5 | — | — | 0 | — | 87.0 | 3.0 | — | — | 10.0 |
| Example 6 | — | 58.5 | 3.0 | — | 38.5 | — | — | 0 | — | 87.5 | — | 3.0 | 9.5 | — |
| Example 7 | — | 55.5 | 3.0 | — | — | 41.5 | — | 0 | 80.0 | — | 3.0 | — | — | 17.0 |
| Example 8 | 58.0 | — | — | 3.0 | 39.0 | — | — | 0 | 80.0 | — | 3.0 | — | — | 17.0 |
| Example 9 | — | 58.5 | 3.0 | — | 38.5 | — | — | 0 | 80.0 | — | 3.0 | — | — | 17.0 |
| Example 10 | — | 58.5 | 3.0 | — | 38.5 | — | — | 0 | 80.0 | — | 3.0 | — | — | 17.0 |
| Example 11 | — | 58.5 | 3.0 | — | 38.5 | — | — | 0 | 80.0 | — | 3.0 | — | — | 17.0 |
| Example 12 | — | 58.5 | 3.0 | — | 38.5 | — | — | 0 | 80.0 | — | 3.0 | — | — | 17.0 |
| Example 13 | — | 58.5 | 3.0 | — | 38.5 | — | — | 0 | 80.0 | — | 3.0 | — | — | 17.0 |
| Example 14 | — | 58.5 | — | 3.5 | 38.0 | — | — | 0 | 78.0 | — | — | — | — | 22.0 |
| Example 15 | — | 64.5 | 3.5 | — | 5.0 | 12.0 | 15.0 | 0 | 78.0 | — | — | — | — | 22.0 |
| Example 16 | — | 64.5 | 3.5 | — | 5.0 | 12.0 | 15.0 | 0 | 78.0 | — | — | — | — | 22.0 |
| C. Example 1 | — | 58.5 | 3.0 | — | 38.5 | — | — | 0 | 49.0 | — | 3.0 | — | — | 48.0 |
| C. Example 2 | (ordinary Acrylic polymer emulsion Tg = −11° C.) | | | | | | | | | | | | | |
| Comparative Example 3 | Acrylic polymer emulsion $S_1/S_2$ = 70/30 blend | | | | | | | | | | | | | |
| Comparative Example 4 | Acrylic polymer emulsion $S_3/S_4$ = 50/50 blend | | | | | | | | | | | | | |

| | | | | Item | | | | | | |
|---|---|---|---|---|---|---|---|---|---|---|
| | | Core part/ | | Monomer composition Total monomer composition | | | | | | |
| | $Tg_B$ | skin layer part | | M-1 (wt %) | | M-2 (wt %) | | M-3 (wt %) | | |
| Experiment No. | (°C.) | $M_A/M_B$ | M-2 | 2EHA | BA | EA | AA | MAA | MMA | St | An |
| Example 1 | −40 | 70/30 | 70/30 | 24.0 | 40.95 | — | 3.0 | — | 26.95 | 5.1 | — |
| Example 2 | −10 | 70/30 | 70/30 | 18.3 | 40.95 | — | 3.0 | — | 26.95 | 10.8 | — |
| Example 3 | −60 | 70/30 | 70/30 | 27.6 | 40.95 | — | 3.0 | — | 26.95 | 1.5 | — |
| Example 4 | −40 | 70/30 | 70/30 | 24.0 | 50.75 | — | 3.0 | — | 17.15 | 5.1 | — |
| Example 5 | −40 | 70/30 | 70/30 | — | 67.05 | — | 3.0 | — | 26.95 | 3.0 | — |
| Example 6 | −40 | 70/30 | 70/30 | — | 67.2 | — | 2.1 | 0.9 | 29.8 | — | — |
| Example 7 | −40 | 70/30 | 70/30 | 24.0 | 38.85 | — | 3.0 | — | — | 34.15 | — |
| Example 8 | −40 | 70/30 | 70/30 | 64.6 | — | — | 0.9 | 2.1 | 27.3 | 5.1 | — |
| Example 9 | −40 | 95/5 | 95/5 | 4.0 | 55.58 | — | 3.0 | — | 36.58 | 0.85 | — |
| Example 10 | −40 | 90/10 | 90/10 | 8.0 | 52.65 | — | 3.0 | — | 34.65 | 1.7 | — |
| Example 11 | −40 | 85/15 | 85/15 | 12.0 | 49.73 | — | 3.0 | — | 32.73 | 2.55 | — |
| Example 12 | −40 | 60/40 | 60/40 | 32.0 | 35.1 | — | 3.0 | — | 23.1 | 6.8 | — |
| Example 13 | −40 | 50/50 | 50/50 | 40.0 | 29.25 | — | 3.0 | — | 19.25 | 8.5 | — |
| Example 14 | −40 | 85/15 | 100/0 | 11.7 | 49.73 | — | — | 2.98 | 32.3 | 3.3 | — |
| Example 15 | −40 | 85/15 | 100/0 | 11.7 | 54.83 | — | 2.98 | — | 4.25 | 13.5 | 12.75 |
| Example 16 | −40 | 85/15 | 100/0 | 11.7 | 54.83 | — | 2.98 | — | 4.25 | 13.5 | 12.75 |
| C. Example 1 | +10 | 70/30 | 70/30 | 14.7 | 40.95 | — | 3.0 | — | 29.95 | 14.4 | — |
| C. Example 2 | | | | 24.0 | 40.95 | — | 3.0 | — | 29.95 | 13.5 | — |
| Comparative Example 3 | $Tg(S_1)$ = 0° C. $Tg(S_2)$ = −40° C. | | | — 80.0 | 58.5 — | — — | 3.0 3.0 | — — | 38.5 — | — 17.0 | — — |
| Comparative Example 4 | $Tg(S_3)$ = −24° C. $Tg(S_4)$ = −41° C. | | | — — | 4.6 64.2 | 92.8 33.2 | 2.6 2.6 | — — | — — | — — | — — |

(Part 2)

Item
Characteristic values of acrylic polymer aqueous dispersion

| | Solid percentage (weight | Viscosity | Average particle size | Carboxylic acid content (meq/100 g) | | Film tur- | Whiteness lowering percen- |
|---|---|---|---|---|---|---|---|
| Experi- | | | | Polymer | Composite | | |

TABLE 1-continued

| ment No. | %) | PH | (cps) | (μ) | A | particles | bidity | tage (%) |
|---|---|---|---|---|---|---|---|---|
| Example 1 | 50 | 2.2 | 150 | 0.25 | 43 | 44 | 3.0 | 65.0 |
| Example 2 | 50 | 2.1 | 120 | 0.25 | 43 | 45 | 2.5 | 57.2 |
| Example 3 | 50 | 2.1 | 140 | 0.26 | 43 | 43 | 2.8 | 69.6 |
| Example 4 | 50 | 2.1 | 120 | 0.24 | 44 | 45 | 3.5 | 71.7 |
| Example 5 | 50 | 2.3 | 130 | 0.26 | 43 | 44 | 4.0 | 65.5 |
| Example 6 | 50 | 2.2 | 120 | 0.25 | 43 | 43 | 3.5 | 61.3 |
| Example 7 | 50 | 2.1 | 210 | 0.24 | 44 | 45 | 3.6 | 63.8 |
| Example 8 | 50 | 2.1 | 190 | 0.25 | 38 | 41 | 3.0 | 63.5 |
| Example 9 | 50 | 2.1 | 110 | 0.25 | 43 | 43 | 2.8 | 54.9 |
| Example 10 | 50 | 2.3 | 130 | 0.26 | 43 | 43 | 2.5 | 57.7 |
| Example 11 | 50 | 2.2 | 120 | 0.24 | 43 | 44 | 3.0 | 61.4 |
| Example 12 | 50 | 2.1 | 150 | 0.25 | 43 | 44 | 3.0 | 66.5 |
| Example 13 | 50 | 2.2 | 110 | 0.25 | 43 | 45 | 3.8 | 67.2 |
| Example 14 | 50 | 2.1 | 120 | 0.26 | 45 | 37 | 3.0 | 62.0 |
| Example 15 | 50 | 2.2 | 110 | 0.24 | 52 | 44 | 3.8 | 61.5 |
| Example 16 | 50 | 2.2 | 110 | 0.25 | 53 | 44 | 3.8 | 59.5 |
| C. Example 1 | 50 | 2.1 | 120 | 0.24 | 44 | 45 | 3.2 | 42.0 |
| C. Example 2 | 50 | 2.2 | 210 | 0.25 | (Homogeneous polymer | 44 | 2.5 | 59.5 |
| Comparative Example 3 | 50 | 2.2 | 150 | 0.24 | (blend) | 44 | 45.2 | 61.8 |
| Comparative Example 4 | 50 | 2.1 | 120 | 0.25 | (blend) | 40 | 10.5 | 67.8 |

C. Example: Comparative Example

TABLE 2

Item: Compounding composition of chipping-resistant aqueous coating composition

| | Vehicle | | Filler | | | | Crosslinking agent | | |
|---|---|---|---|---|---|---|---|---|---|
| Experiment No. | Kind | Use amount (solid composition (weight part) | Calcium carbonate (weight part) | Talc (weight part) | Carbon black (weight part) | Barium meta-borate (weight part) | Zinc acetate (weight part) | Dispersant (weight part) | De-ionized water (weight part) |
| Ex. 21 | Ex. 1 | 200(100) | 107 | 20 | 3 | 20 | — | 1.5 | 54.2 |
| Ex. 22 | Ex. 1 | " | 57 | " | " | " | — | " | 20.8 |
| Ex. 23 | Ex. 1 | " | 190 | " | " | " | — | " | 109.5 |
| Ex. 24 | Ex. 2 | " | 107 | " | " | " | — | " | 54.2 |
| Ex. 25 | Ex. 3 | " | " | " | " | " | — | " | " |
| Ex. 26 | Ex. 4 | " | " | " | " | " | — | " | " |
| Ex. 27 | Ex. 5 | " | " | " | " | " | — | " | " |
| Ex. 28 | Ex. 6 | " | " | " | " | " | — | " | " |
| Ex. 29 | Ex. 7 | " | " | " | " | " | — | " | " |
| Ex. 30 | Ex. 8 | " | " | " | " | " | — | " | " |
| Ex. 31 | Ex. 9 | " | " | " | " | " | — | " | " |
| Ex. 32 | Ex. 10 | " | " | " | " | " | — | " | " |
| Ex. 33 | Ex. 11 | " | " | " | " | " | — | " | " |
| Ex. 34 | Ex. 12 | " | " | " | " | " | — | " | " |
| Ex. 35 | Ex. 13 | " | " | " | " | " | — | " | " |
| Ex. 36 | Ex. 14 | " | " | " | " | " | — | " | " |
| Ex. 37 | Ex. 15 | " | " | " | " | " | — | " | " |
| Ex. 38 | Ex. 16 | " | " | " | " | " | — | " | " |
| C. Ex 11 | C. Ex 1 | " | " | " | " | " | — | " | " |
| C. Ex 12 | C. Ex 2 | " | " | " | " | " | — | " | " |
| C. Ex 13 | C. Ex 3 | " | " | " | " | " | — | " | " |
| C. Ex 14 | C. Ex 4 | " | " | " | " | " | — | " | " |
| Ex. 39 | Ex. 1 | " | 190 | " | " | " | — | " | — |
| Ex. 40 | Ex. 11 | " | " | " | " | " | — | " | — |
| Ex. 41 | Ex. 14 | " | " | " | " | " | — | " | — |
| Ex. 42 | Ex. 15 | " | " | " | " | " | — | " | — |
| Ex. 43 | Ex. 16 | " | " | " | " | " | — | " | — |
| Ex. 44 | Ex. 16 | " | " | " | " | " | 2.0 | " | — |

Item: Chipping-resistant aqueous coating composition

| Experiment No. | Solid component (weight part) | PH | Viscosity (cps) | PWC (weight part) | Blister threshold (μ) | Resistance to chipping 20° C. (Kg) | Resistance to chipping −30° C. (Kg) | Resistance to water |
|---|---|---|---|---|---|---|---|---|
| Ex. 21 | 60 | 9.2 | 11000 | 60 | 850 | 30 | 30 | 100/100 |
| Ex. 22 | " | 9.1 | 13000 | 50 | 750 | 35 | 35 | 90/100 |
| Ex. 23 | " | 9.0 | 12000 | 70 | 900 | 25 | 25 | 100/100 |
| Ex. 24 | " | 9.2 | 12000 | 60 | 800 | 35 | 20 | 100/100 |
| Ex. 25 | " | 9.1 | 15000 | " | " | 30 | 35 | 90/100 |
| Ex. 26 | " | 9.2 | 11000 | " | " | 25 | 40 | 70/100 |
| Ex. 27 | " | 9.2 | 13000 | " | " | 30 | 30 | 90/100 |

TABLE 2-continued

| | | | | | | | | |
|---|---|---|---|---|---|---|---|---|
| Ex. 28 | " | 9.1 | 14000 | " | " | 25 | " | " |
| Ex. 29 | " | 9.3 | 15000 | " | 850 | 30 | " | " |
| Ex. 30 | " | 9.2 | 12000 | " | 800 | " | 25 | " |
| Ex. 31 | " | 9.1 | 15000 | 60 | 850 | " | 20 | 100/100 |
| Ex. 32 | " | 9.3 | 11000 | " | 800 | " | 25 | " |
| Ex. 33 | " | 9.2 | 12000 | " | " | " | " | " |
| Ex. 34 | " | 9.1 | 14000 | " | " | 25 | 35 | 80/100 |
| Ex. 35 | " | 9.0 | 11000 | " | 850 | 20 | 40 | 70/100 |
| Ex. 36 | " | 9.1 | 12000 | " | 800 | 25 | 25 | 100/100 |
| Ex. 37 | " | 9.0 | 13000 | " | 850 | 30 | 30 | " |
| Ex. 38 | " | 9.0 | 11000 | " | " | 35 | " | " |
| C. Ex 11 | " | 9.1 | 12000 | " | 800 | 15 | 5 | " |
| C. Ex 12 | " | 9.2 | 12000 | " | 700 | 25 | 10 | 80/100 |
| C. Ex 13 | " | 9.3 | 13000 | " | 550 | 15 | " | 60/100 |
| C. Ex 14 | " | 9.1 | 12000 | " | 450 | " | 20 | 40/100 |
| Ex. 39 | 77 | 9.0 | 24000 | 70 | 1000 | 25 | 25 | 100/100 |
| Ex. 40 | " | 9.1 | 23000 | " | " | " | 20 | " |
| Ex. 41 | " | 9.0 | 26000 | " | " | " | 25 | " |
| Ex. 42 | " | 9.1 | 25000 | " | " | 30 | " | " |
| Ex. 43 | " | 9.1 | 23000 | " | " | 35 | " | " |
| Ex. 44 | " | 9.2 | 28000 | " | 1200 | 40 | 30 | " |

Ex.: Example
C. Ex: Comparative Example

We claim:

1. An aqueous dispersion of an acrylic polymer comprising particles of the acrylic polymer dispersed in an aqueous medium, wherein the particles of the acrylic polymer are composite particles comprising a core part comprising a carboxyl group-containing acrylic polymer (A) whose glass transition temperature is in the range of $-20°$ C. to $10°$ C. and a skin layer part covering the core part and comprising an acrylic polymer (B) whose glass transition temperature is $-20°$ C. or less, the polymer (A) and the polymer (B) are contained in amounts of 50 to 95 weight % and 50 to 5 weight % based on the weight of the particles, respectively, and the glass transition temperature ($Tg_A$) of the polymer (A) is higher than the glass transition temperature ($Tg_B$) of the polymer (B).

2. The aqueous dispersion of claim 1 wherein the polymer (A) has a glass transition temperature in the range of $-20°$ C. to less than $5°$ C.

3. The aqueous dispersion of claim 1 wherein the polymer (B) has a glass transition temperature in the range of $-100°$ C. to $-20°$ C.

4. The aqueous dispersion of claim 1 wherein the glass transition temperature ($Tg_A$) of the polymer (A) is higher than the glass transition temperature ($Tg_B$) by $10°$ C. or more.

5. The aqueous dispersion of claim 1 wherein the composite particles contain 60 to 90 weight % of the polymer (A) and 40 to 10 weight % of the polymer (B) based on the weight of the particles.

6. The aqueous dispersion of claim 1 wherein the polymer (A) contains 2.5 to 150 mg equivalent of carboxyl groups per 100 g of the polymer (A).

7. The aqueous dispersion of claim 1 wherein the polymer (A) is a carboxyl group-containing acrylic copolymer obtained by copolymerizing (M-1) 40 to 99.5 weight % of an acrylic acid alkyl ester which is represented by the formula $$CH_2=CH-COOR^1 \qquad (I)$$

wherein $R^1$ represents a straight-chain or branched chain alkyl group having 2 to 12 carbon atoms, and wherein the glass transition temperature of its homopolymer is $-20°$ C. or less;

(M-2) 0.5 to 20 weight % of an $\alpha,\beta$-unsaturated mono-, or dicarboxylic acid having 3 to 5 carbon atoms;

(M-3) 0 to 59.5 weight % of a (meth)acrylic monomer other than the above (M-1) represented by the formula $$\underset{CH_2=C-X}{\overset{R^2}{|}} \qquad (II)$$

wherein $R^2$ represents a hydrogen atom or methyl group, and X represents an aryl group having 6 to 8 carbon atoms, nitrile group, $-COOR^3$ group or $-O-COR^4$ group wherein $R^3$ represents a straight-chain or branched chain alkyl group having 1 to 20 carbon atoms, straight-chain or branched chain alkenyl group having 10 to 20 carbon atoms, cycloalkyl group having 6 to 8 carbon atoms or aralkyl group having 7 to 20 carbon atoms, and $R^4$ represents a hydrogen atom or straight-chain or branched alkyl group having 1 to 12 carbon atoms; and (M-4) 0 to 5 weight % of another monomer having at least one radical-polymerizable unsaturated group in the molecule.

8. The aqueous dispersion of claim 1 wherein the polymer (B) is an acrylic polymer obtained by polymerizing (M-1) 50 to 100 weight % of an acrylic acid alkyl ester which is represented by the formula $$CH_2=CH-COOR^1 \qquad (I)$$

wherein $R^1$ represents a straight-chain or branched chain alkyl group having 2 to 12 carbon atoms, and wherein the glass transition temperature of its homopolymer is $-20°$ C. or less;

(M-2) 0 to 10 weight % of an $\alpha,\beta$-unsaturated mono-, or dicarboxylic acid having 3 to 5 carbon atoms;

(M-3) 0 to 50 weight % of a (meth)acrylic monomer other than the above (M-1) represented by the formula $$\underset{\underset{CH_2=C-X}{|}}{R^2} \quad (II)$$

wherein $R^2$ represents a hydrogen atom or methyl group, and X represents an aryl group having 6 to 8 carbon atoms, nitrile group, —$COOR^3$ group or —O-$COR^4$ group wherein $R^3$ represents a straight-chain or branched chain alkyl group having 1 to 20 carbon atoms, straight-chain or branched chain alkenyl group having 10 to 20 carbon atoms, cycloalkyl group having 6 to 8 carbon atoms or aralkyl group having 7 to 20 carbon atoms, and $R^4$ represents a hydrogen atom or straight-chain or branched chain alkyl group having 1 to 12 carbon atoms; and (M-4) 0 to 5 weight % of another monomer having at least one radical-polymerizable unsaturated group in the molecule.

9. The aqueous dispersion of claim 1 wherein the composition of all the monomers constituting the composite particles is as follows:

(M-1) 40 to 90 weight % of an acrylic acid alkyl ester which is represented by the formula $$CH_2=CH-COOR^1 \quad (I)$$

wherein $R^1$ represents a straight-chain or branched chain alkyl group having 2 to 12 carbon atoms, and wherein the glass transition temperature of its homopolymer is $-20°$ C. or less;

(M-2) 0.5 to 10 weight % of an $\alpha,\beta$-unsaturated mono-, or dicarboxylic acid having 3 to 5 carbon atoms;

(M-3) 0 to 60 weight % of a (meth)acrylic monomer other than the above (M-1) represented by the formula $$\underset{\underset{CH_2=C-X}{|}}{R^2} \quad (II)$$

wherein $R^2$ represents a hydrogen atom or methyl group, and X represents an aryl group having 6 to 8 carbon atoms, nitrile group, —$COOR^3$ group or —O-$COR^4$ group wherein $R^3$ represents a straight-chain or branched chain alkyl group having 1 to 20 carbon atoms, straight-chain or branched chain alkenyl group having 10 to 20 carbon atoms, cycloalkyl group having 6 to 8 carbon atoms or aralkyl group having 7 to 20 carbon atoms, and $R^4$ represents a hydrogen atom or straight-chain or branched chain alkyl group having 1 to 12 carbon atoms; and (M-4) 0 to 5 weight % of another monomer having at least one radical-polymerizable unsaturated group in the molecule.

10. The aqueous dispersion of claim 1 wherein the composite particles have an average particle size in the range of 0.05 to 0.5 microns.

11. The aqueous dispersion of claim 1 wherein the composite particles contain 5 to 150 mg equivalents of carboxyl groups per 100 g of the particles.

12. The aqueous dispersion of claim 1 wherein the concentration of solid components is in the range of 10 to 70 weight %.

* * * * *